US008893224B2

(12) United States Patent
Horvitz et al.

(10) Patent No.: US 8,893,224 B2
(45) Date of Patent: Nov. 18, 2014

(54) ZONE POLICY ADMINISTRATION FOR ENTITY TRACKING AND PRIVACY ASSURANCE

(75) Inventors: Eric Horvitz, Kirkland, WA (US); Ruston John David Panabaker, Bellevue, WA (US); William Jefferson Westerinen, Issaquah, WA (US); Alexander Frank, Bellevue, WA (US); Johannes Klein, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1896 days.

(21) Appl. No.: 11/468,039

(22) Filed: Aug. 29, 2006

(65) Prior Publication Data
US 2008/0072284 A1  Mar. 20, 2008

(51) Int. Cl.
*G06F 7/04* (2006.01)
*G06F 17/30* (2006.01)
*G06F 17/50* (2006.01)

(52) U.S. Cl.
CPC .......... *G06F 17/30241* (2013.01); *G06F 17/50* (2013.01)
USPC .................................................. 726/2; 726/3

(58) Field of Classification Search
CPC ........................... G06F 17/30241; G06F 17/50
USPC ......... 726/17, 4.2, 34, 22; 709/223, 229, 238; 707/200, 204, 100; 380/255, 229, 232, 380/239
See application file for complete search history.

(56) References Cited

U.S. PATENT DOCUMENTS 4,987,406 A * 1/1991 Reid ........................... 340/539.3
6,100,806 A   8/2000 Gaukel (Continued)

FOREIGN PATENT DOCUMENTS

WO  2004/104619 A1  12/2004

OTHER PUBLICATIONS

Ardagna, et al., "Supporting Location-Based Conditions in Access Control Policies", Date: 2006, pp. 212-222, ACM Press, NY, USA, http://delivery.acm.org/10.1145/1130000/1128850/p212-ardagna.pdf?key1=1128850&key2=4313494511&coll=GUIDE&dl=GUIDE&CFID=74220359&CFTOKEN=92790055.

(Continued)

*Primary Examiner* — Brandon Hoffman
*Assistant Examiner* — Nega Woldemariam
(74) *Attorney, Agent, or Firm* — Dan Choi; Judy Yee; Micky Minhas (57) ABSTRACT

The present invention includes entity tracking, privacy assurance, and zone policy administration technologies allowing for the creation of zone policies, including the definition of zones and managed entities, the zone policies including rules that apply to the managed entities within or in relation to the zones, and privacy policies assuring privacy of sensitive data. The technologies also provide for the definition of sensors, rule event objects, and default event objects, and for the establishment of associations between rules and managed entities, sensors, and rule event objects so as to create zone policies. Event objects may generate zone policy events or actions upon compliance with or violation of various rules of zone policy. Managed entities are defined as entities associated with mobile devices capable of location tracking and communication with zone policy servers. Entities may be persons, vehicles, animals, or any other object for which tracking and zone policy administration is of value. Zone policy may include privacy policy that may restrict access to or set access conditions for data or information. Privacy policies may be used to ensure individual managed entities and their data remain anonymous to a desired degree and that sensitive data is appropriately protected.

18 Claims, 5 Drawing Sheets

(56) References Cited

U.S. PATENT DOCUMENTS

| | | |
|---|---|---|
| 6,742,037 B1 | 5/2004 | Hall et al. |
| 7,072,956 B2 | 7/2006 | Parupudi et al. |
| 2002/0120394 A1 | 8/2002 | Rayne |
| 2003/0008662 A1 | 1/2003 | Stern et al. |
| 2004/0174264 A1* | 9/2004 | Reisman et al. ............ 340/573.4 |
| 2005/0068169 A1* | 3/2005 | Copley et al. ............ 340/539.13 |
| 2006/0009152 A1* | 1/2006 | Millard et al. ................ 455/12.1 |
| 2006/0121851 A1 | 6/2006 | Moore et al. |
| 2006/0166679 A1 | 7/2006 | Karaoguz et al. |

OTHER PUBLICATIONS

Leonhardt, et al., "Towards a general location service for mobile environments", http://www.doc.ic.ac.uk/~ul/pdf/sdne.pdf; retrieved Oct. 12, 2006.

Schmidt, et al., "There is more to Context than Location", http://www.teco.uni-karlsruhe.de/~albrecht/publication/draft_docs/context-is-more-than-location.pdf; retrieved Oct. 12, 2006.

* cited by examiner

ZONE POLICY ADMINISTRATION FOR ENTITY TRACKING AND PRIVACY ASSURANCE

BACKGROUND

In many cases it is desirable to track, receive notifications and/or apply various rules as a person (or other entity) moves about, as time passes, or as different people (or entities) enter or leave the proximity of the tracked person or entity. Consider the case of a convict in a work release program. It is desirable for a parole officer to monitor the convict, to ensure, for example, that he is physically at work when he should be, that he is not violating any restraining order, etc. But such monitoring can be labor-intensive and costly. Also, consider a parent desiring to monitor the location of a mentally handicapped child prone to wander off. In other examples, a Department of Homeland Security agent may wish to know when a large quantity of ammonium nitrate is approaching particular locations. A parent may want to know when a sexual predator is within a certain distance of their children. A chemist may want a laboratory to report when lithium and water are within some distance of one another. And a self-reporting nano-material may report whenever another nano-material is detected within some sensitive zone. These and many other scenarios for monitoring physical and/or virtual entities based on a set of rules and in relation to various zones tend to be difficult and expensive manual efforts at best.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

The present examples provide entity tracking and zone policy administration technologies providing for, among other things, the defining of zones and managed entities, and for the creation of zone policies including rules that apply to the managed entities within or in relation to the zones, and privacy policies assuring privacy of sensitive data. These technologies further provide for the definition of sensors and event objects, as well as associations between zones, sensors, managed entities, and event objects so as to create zone policy based on a zone policy framework. A managed entity, an entity associated with a mobile device, may be a person, vehicle, animal, or any other object, physical or virtual, for which tracking and zone policy administration may be of value. A privacy policy may restrict access to or set access conditions for data or information. Privacy policies may be used to ensure individual managed entities and their data remain anonymous to a desired degree and that sensitive data is appropriately protected.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in a computing and networking environment, the environment described is provided as an example and not a limitation. As those skilled in the art will appreciate, the present examples are suitable for application in a variety of different environments.

Figure 1:
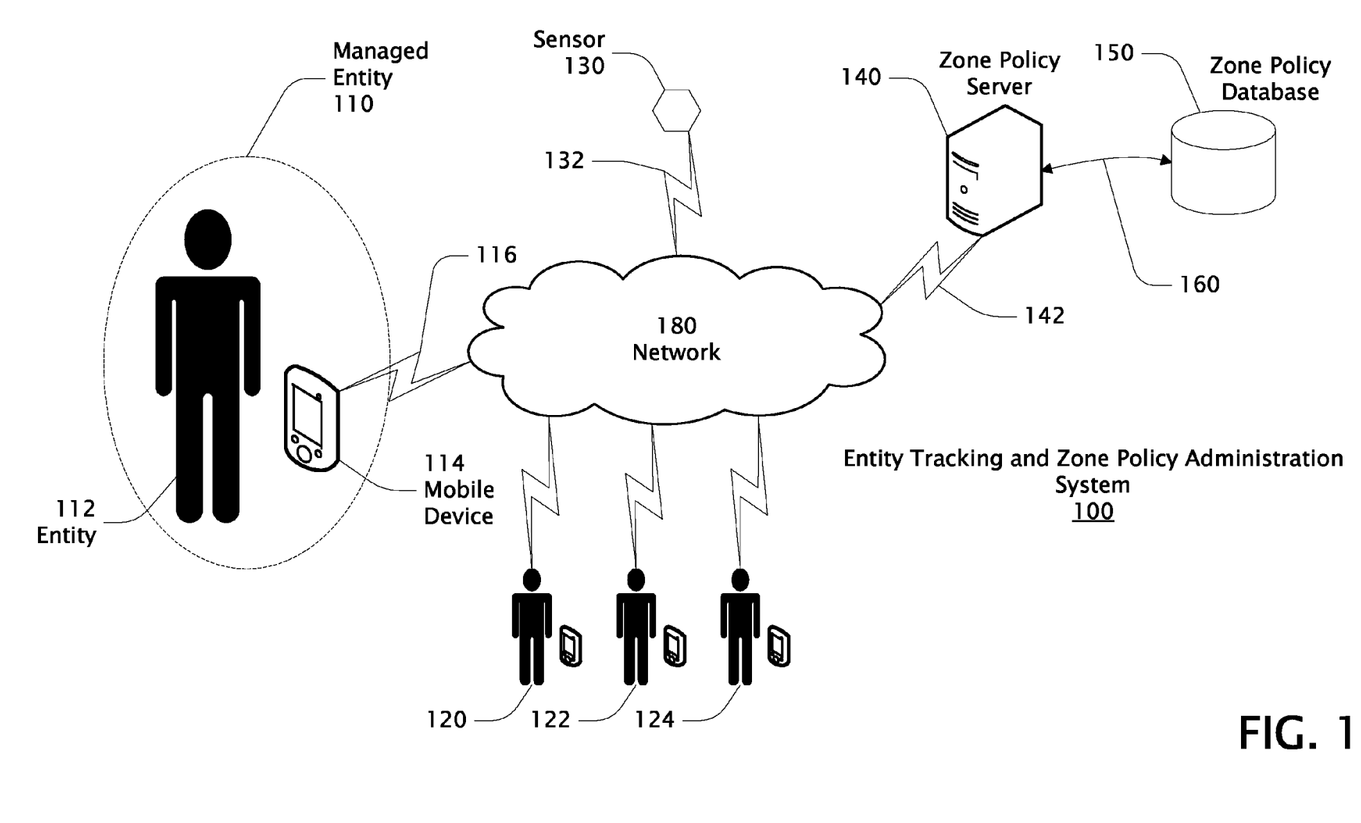
FIG. 1 is block diagram showing an example entity tracking and zone policy administration system.

FIG. 1 is block diagram showing an example entity tracking and zone policy administration ("ET-ZPA") system 100. Elements of ET-ZPA system 100 may include: mobile devices, such as mobile device 114, associated with entities, such as person 112, forming managed entities, such as managed entity 110, 120, 122, and 124; sensors, such as sensor 130; zone policy servers, such as server 140; zone policy data stores, such as database 150; and communications networks, such as network 180.

Example managed entity 110 includes an entity, such as person 112, and a mobile device 114. Mobile device 114 is associated with entity 112 forming a managed entity. An entity may be a person, vehicle, animal, package, or any other physical object for which tracking and zone policy administration may be desirable. A mobile device may be a personal data assistant ("PDA"), cell phone, electronic bracelet, electronic tag, electronic badge, implantable device, computer, or the like such as the computing environment described in connection with FIG. 5. Such a mobile device may include a means for location sensing and/or tracking, such as global positioning system ("GPS") position tracking, a coupling to a network access point, a coupling to a radio frequency ("RF") beacon, user assertion, cell tower and/or wireless fidelity ("Wi-Fi") triangulation, or the like, and a means for communication, such as wireless communication to a network such as the internet or the like. Such a mobile device may also include processing capability such that zone policy software may be operated on the device, and/or the device may be capable of creating and/or joining ad-hoc networks with other devices, participating in a federation of devices, and engaging in communications with such devices.

Managed entities, such as managed entities 110, 120, 122, and 124 are typically coupled to network 180 via a communication links, such as link 116. Such communication links may be wireless links or any other type of link suitable to the entity being managed. In one example, such a link may be provided by a cell phone acting as the mobile device. In another example, such a link may be provided by a short range RF transponder.

Each mobile device typically includes as unique identifier, such as a global unique identifier ("GUID") or the like, so as to enable each mobile device to be uniquely recognized by an ET-ZPA system. Each mobile device may also include identification information for the entity to which it is associated. For example, mobile device 114 is shown in FIG. 1 associated with entity 112, a person, and includes identifying information for person 112 sufficient for entity tracking and zone policy administration purposes. In one example, when the entity is a person the identity information includes name, address, and other contact information. Other information may include birth date, digital biometric information, license information (such as a driver license number, state, etc.), passport information, employee identification information, health information (such as blood type, disability descriptions, doctor's information, etc.), emergency contact information, or the like. One purpose of such identity information is to uniquely identify the entity associated with the mobile device. If the entity is a vehicle, animal, package, or some other object, the identity information may be sufficient for entity tracking and zone policy application purposes of such an object.

In another example, a mobile device may be a "dumb" tracking device, capable of limited location tracking and limited communication capability. Such limited communication capability may be limited to providing location tracking information along with basic mobile device identification information. Further limitations may include periodic versus continuous communications, limited-range communications, reply-only communications, or the like. With such a dumb device, most or all of zone policy-related processing is typically performed remotely by other mobile device, zone policy servers, such as server 140, or the like.

In yet another example, a "smart" mobile device may include local zone policy storage and processing capability. For example, such a smart device may download appropriate zone policy information during communication with zone policy server 140 via network 180, and be capable of processing such zone-policy information even when later out of communication with zone policy server 140. Such a smart device may also be capable of establishing "ad-hoc" networks with other devices, of participating in a federation of devices, and of sharing information about associated managed entities, even when unable to or out of communication with zone policy server 140.

In some situations, such as with a person entity carrying a mobile device such as a cell phone, mobile computer, PDA, or the like, it may be desirable to periodically validate that the correct person is in current possession of the mobile device. In one example, such authentication and validation may be accomplished by periodically requiring a log-on, such as with a private password, or via a biometric data, such as a finger print, iris scan, voice print, or the like. In another example, such an authentication and validation may be required at a particular point in time as part of a zone policy, such as when entering a particular zone. In general, the purpose of such authentication and validation is to verify that the mobile device is currently in the possession of the associated entity.

An ET-ZPA system 100 may also include sensors, such as sensor 130, with each sensor coupled to network 180 via a communication link, such as link 132, and thereby coupled to devices such as mobile device 114. Alternatively, sensors may be directly coupled to a mobile device, or the sensors may be coupled to an intermediary device or devices, the intermediary device or devices being coupled to network 180. Communication links, such as link 132, may be wireless or wired links or any other type of link suitable to the sensor being utilized. Such sensors may be configured to monitor environmental or other conditions suitable for entity tracking and zone policy administration purposes. For example, various sensors may be positioned at or around zones of interest so as to monitor weather conditions, degree of daylight, noise, moisture, or any other environmental condition of interest. In another example, a sensor may be a smoke alarm, a burglar alarm, a carbon monoxide detector, or the like. In another example, a sensor may be a beacon sensor, capable of receiving data or information from a beacon. A beacon may be a location beacon capable of broadcasting or sending location information, a marker beacon capable of broadcasting or sending information about an object or location the beacon is marking, or any other type of beacon capable of broadcasting or sending data or information useful for entity tracking and zone policy administration purposes.

In yet another example, a sensor may monitor for power outages, natural gas shut-offs, phone line functionality, or the like. Other example sensors may monitor speed, altitude, acceleration, or the like. Yet other example sensors may be applied to persons, animals, or other living creatures to monitor vital signs such as heart rate, blood pressure, brain wave activity, stress, or the like. Each such sensor typically includes a unique identifier, such as a global unique identifier ("GUID") or the like, so as to enable each sensor to be uniquely recognized by an ET-ZPA system.

An ET-ZPA system 100 also typically includes zone policy servers, such as server 140, coupled to network 180 via communication links, such as link 142. Such communication links may be wireless or wired links or any other type of link suitable to the server being utilized. Such servers may be coupled 160 to zone policy data stores, such as database 150, that may be local or remote to a server. In one example, zone policy server 140 is a computing environment such as that described in connection with FIG. 5. Such servers typically host zone policy software sufficient to enable the configuration and management of zones, entities, sensors, zone policies, and event objects. Zone policy servers may alternatively be implemented as a web service providing zone policy functionality, or as some other type of centralized or distributed service.

Figure 2:
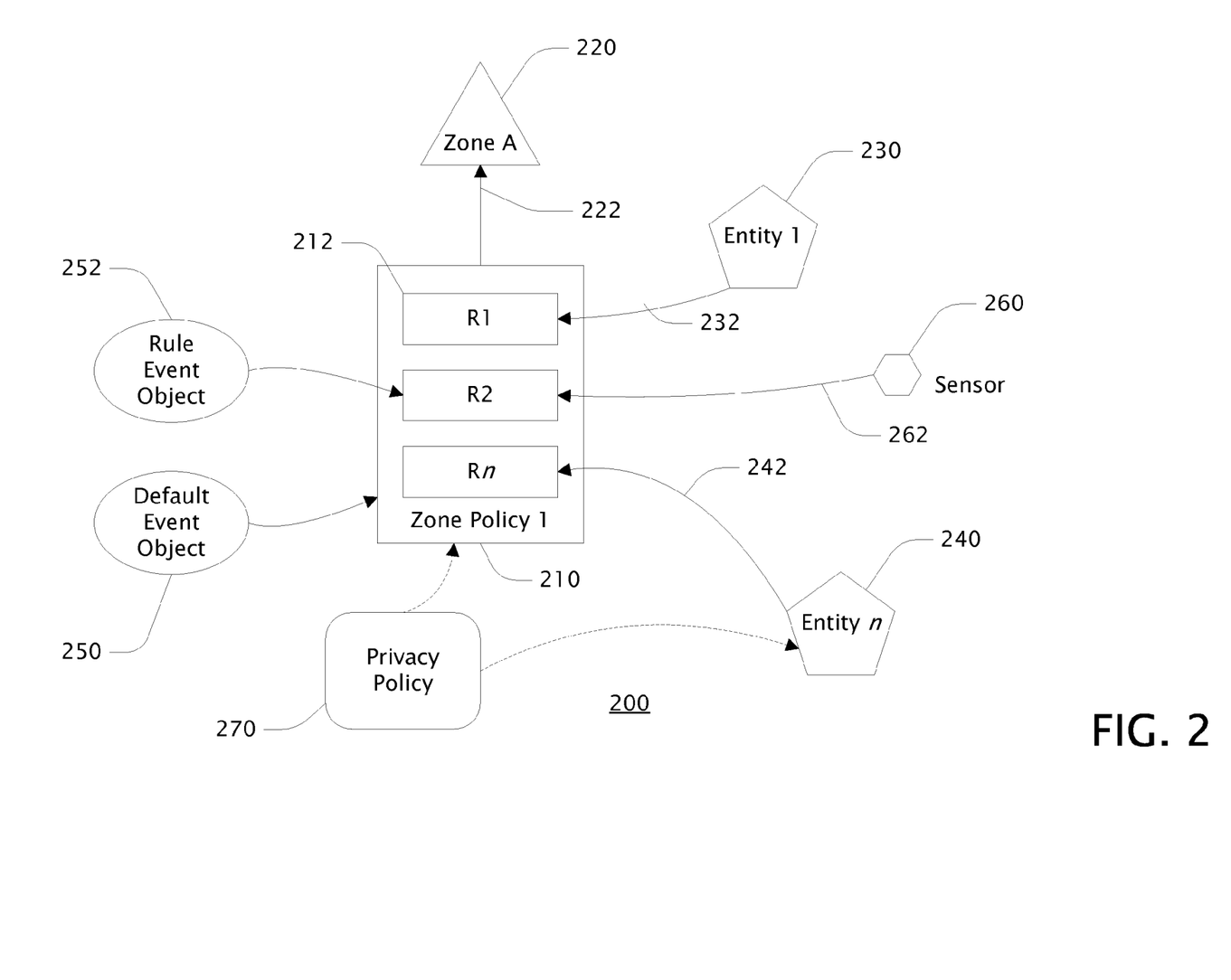
FIG. 2 is a block diagram showing an example zone policy framework including a zone policy with rules, a zone definition, and two entity definitions.

FIG. 2 is a block diagram showing an example zone policy framework 200 including an example zone policy with rules, a zone definition 220, and two managed entity definitions 230 and 240. In general, a zone policy framework includes a collection of zone definitions, entity definitions, sensor definitions, zone policies, and associations. Such a framework may be an object model, a schema, or any other description, representation and/or definition of zone policy, its structure and/or scope.

Example zone definition 220 defines Zone A that, in one example, includes a zone name, description, and border information sufficient to describe the physical borders of the zone. A zone may be defined, at least in part, in terms of a perimeter (such as sides of a lot, a radius around a location center point, or other boundary descriptions or the like), an area, a volume, or the like. Such a definition may include physical coordinates as well as sub-zones definitions. In one example, when a zone is defined for a building, the zone definition may include information sufficient to describe the building floor plan including multiple levels, room descriptions, hall ways, doors, windows, elevators, stairs, and the like. In other examples, a zone definition may define a road, trail, home, school, office, park, cave, lake, river, airspace, or any other physical or geographic area, collection of areas (sub-zones), or the like. A zone policy may include any number of zone and/or sub-zone definitions.

Example managed entity definitions 230 and 240 define Entity 1 and Entity n respectively that, in one example, include an entity name, description and other identification information appropriate for entity tracking and zone policy administration purposes. A managed entity definition may be associated with one or more rules or sub-rules, as indicated by links 232 and 242. A zone policy may include any number of managed entity definitions.

Example zone policy definition 210 defines Zone Policy 1 and includes example rules, such as rule 212. A zone policy may be associated with one or more zones. For example, Zone Policy 1 is shown associated with Zone A by link 222. A zone policy definition is typically comprised of rules and sub-rules that, when taken together, define the zone policy. Rules and sub-rules may have associated with them one or more entities, sensors, rule event objects, and/or zones. For example, rule R1 is shown in FIG. 2 to have associated with it Entity 1, and rule Rn is shown to have associated with it Entity n. A zone policy may also have associated with in a default event object, such as object 250.

Example default event object 250 is shown associated with Zone Policy 1. Such an event object may generate a zone policy event or action on compliance with all rules of the zone policy and/or on violation of any of the rules. Example rule event object 252 is shown associated with rule R2 and may generate a zone policy event or action on compliance with example rule R2 and/or on violation of rule R2. Such events/actions may be configurable programmatically and/or by ET-ZPA system administrators or users. Zone policy events or actions may be generated by default event objects and rule event objects, and typically indicate compliance with or violation of some aspect of zone policy.

Example sensor 260 is shown associated with rule R2. A sensor definition may be associated with one or more rules or sub-rules, as indicated by link 262. A zone policy may include any number of sensor definitions.

Example privacy policy 270 is shown optional associated with Zone Policy 1 (210) and/or Entity n (240). A privacy policy may also be applied to a zone, a sensor, a rule, an event object, or any element of a zone policy framework. A privacy policy may restrict access to or set access conditions for data or information. In particular, privacy policies may be used to ensure individual managed entities and their data remain anonymous to a desired degree and that sensitive data is appropriately protected. For example, a privacy policy applied to a zone may ensure that only certain composite statistics based on specific information about people (managed entities) within the zone may be reported, and that such information cannot be reported unless the number of people in the zone is greater than some predefined number. People may be comfortable with reporting, for example, their income or other personal information if they know that such information gathered within a particular zone will only be reported in the aggregate, and only if greater than some large number of people are in the zone.

More sophisticated privacy policies may be developed that are discovered to be acceptable to people within zones of different kinds. For example, a shopper who would never share income and/or preference information might accept a policy within a store zone that reports statistics regarding the income and/or preferences of a number of people within the store zone, but that cannot report statistics about particular income bands unless there are more than "p" people present in each of "b" sets of bands, so as to maintain a bound on the ability of a store to discriminate more specifically about a particular person.

In yet another example, a privacy policy may be applied that limits information obtained from different zones about the same managed entity to be combined to make inferences. Such a limitation for combining information from different zones may also be applied to the same zone at different times. Such constraints may be relaxed to allow information to be combined from more than one zone, or the same zone, when the time the managed entity is in the zone is greater than some specified time, which may be a function of the type of information and/or zone.

Zone policy configuration software may be utilized to configure a zone policy framework. Such software may include digital maps such as road maps, political maps, and/or terrain maps. Such maps may include places such as homes, schools, cities and towns, stores, hospitals, bars and nightclubs, police stations, parks, or any other place, building, area or the like of value for entity tracking and zone policy administration purposes. Zone policy configuration software may also include means for viewing, importing and/or drawing floor plans of buildings and diagrams of outdoor areas such as parks, trails, and the like. Further, such configuration software typically includes means for creating and editing zone definitions for indoor and/or outdoor locations. Various parties may each have rights to manage different portions of an ET-ZPA system, For example, school administrators may have the ability to define a zone and create policy for a school environment while a mother may have the ability to control an entity and rules corresponding to her child and also create policy making use of the school zone, but without the ability to modify it.

Zone policy configuration software typically provides means for defining zones, managed entities (including their associated mobile devices), sensors, privacy policies, event objects, and other elements of a zone policy framework, and providing related identifying information, as well as establishing associations between such. Such software may also make use of managed entity and other data to enable to research and discovery. For example, such software may be used to compute the radius of a circular region around a specific latitude and longitude that contains at least n people with cell phones capable of taking pictures. In another example, a store manager may use such software to gather income and/or spending statistics for people (managed entities) within the store zone at a particular time or over a particular period. In yet another example, a municipal agency may make use of such software to gather statistics about homes and/or businesses (managed entities) within a certain area.

Figure 3:
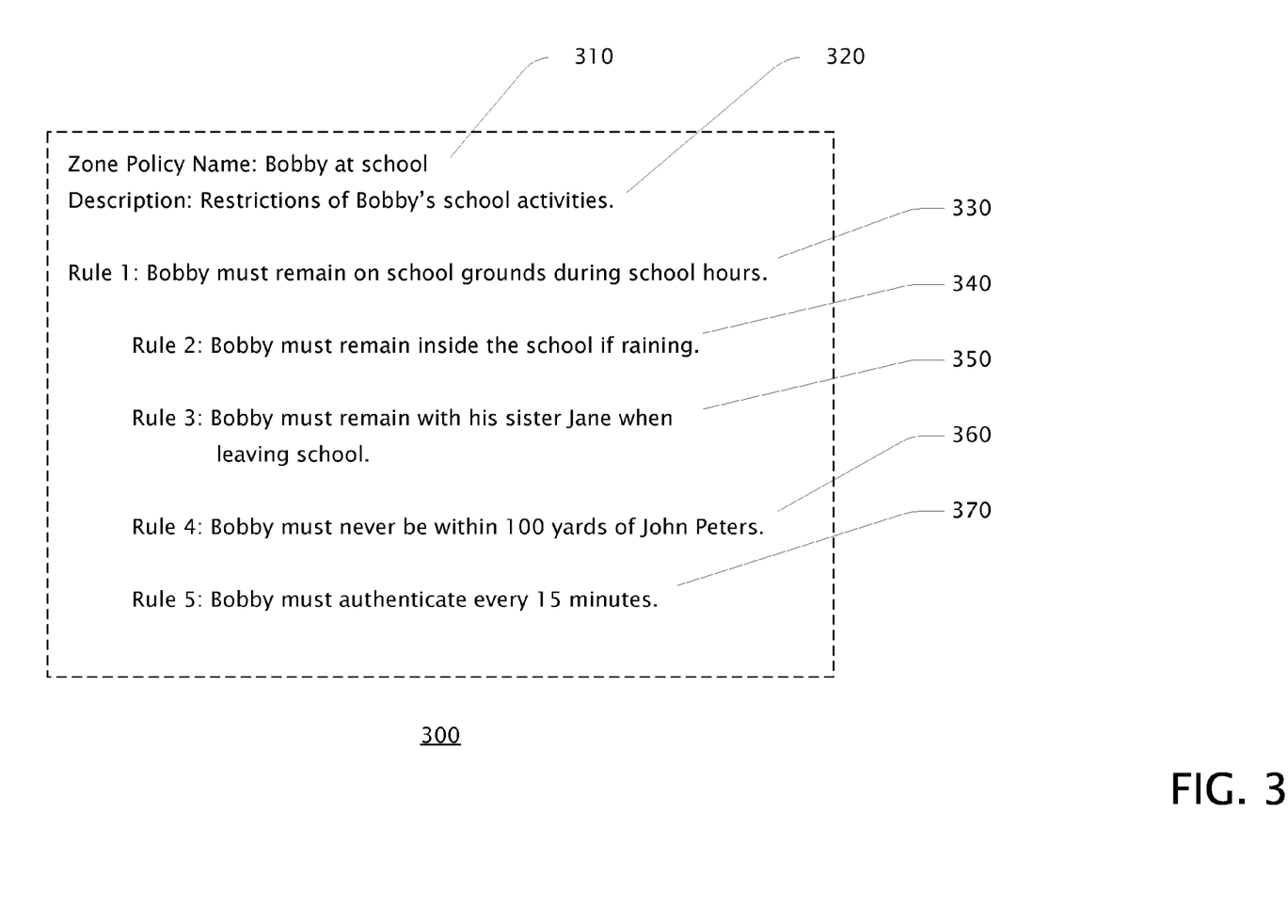
FIG. 3 is a diagram showing an example natural language zone policy.

FIG. 3 is a diagram showing an example natural language zone policy 300. In other examples, a zone policy may be expressed or defined using extensible markup language ("XML") or any other language, meta-language, format, syntax, or the like. In the example shown in FIG. 3, line 310 provides a name for the zone policy. Line 320 provides a description of the zone policy. Example zone policy 300 includes five rules as shown in lines 330, 340, 350, 360, and 370, with rules 2-5 being sub-rules to rule 1. An ET-ZPA system may store and process such zone policies, along with definitions and information about entities, sensors and zones, and monitor zone policy compliance and generate zone policy events or actions as prescribed by the policy. For example, a system using the "Bobby at school" zone policy 300 automatically applies zone policy 300 to Bobby based on the rules of the zone policy and/or when Bobby is located in the "school" zone.

Example rule 1, line 330, includes an association between an entity, "Bobby", and a zone, "school", both of which are typically defined via zone policy configuration software. In configuring the system, "Bobby" is defined as an entity and associated with a mobile device. Characteristics of the zone "school", such as "school hours" and "school grounds", and the like are generally defined as part of the zone "school". In this example, a zone policy event may be generated if Bobby is found to not be in the "school" zone "during school hours."

Example sub-rule 2, line 340, includes the condition "raining" which may be indicated by an association with a sensor. The characteristic of "inside the school" may be defined as a sub-zone of the zone "school". In this example, a zone policy event may be generated if Bobby is found to not be "inside the school" when the condition "raining" is indicated.

Example sub-rule 3, line 350, includes an association with another managed entity, "Jane", Bobby's sister. In configuring the system, Jane is also defined as an entity and associated with a mobile device. Location information, such as current GPS information, related to both Bobby and Jane may be used by the system, in conjunction with information about the "school" zone, to determine if Bobby is with Jane when he leaves the school.

Example sub-rule 4, line 360, includes an association with another managed entity, "John Peters", which may be defined as an entity and associated with a mobile device by a law enforcement agency, for example. Location information, such as current GPS information, related to both Bobby and John Peters may be used by the system to determine if Bobby is within 100 yards of John Peters. As a sub-rule, rule 4 may only be active when rule 1 is active, such as "during school hours".

Example sub-rule 5, line 370, identifies a condition that, if not met, may result in the generation of a zone policy event. In one example, Bobby's mobile device may request a log-in using a secure password every 15 minutes. In another example, the mobile device may use some other means to validate and authenticate that Bobby and the mobile device are not separated. In another example, Bobby may have an implanted mobile device that may override or automatically satisfy this example periodic log-on sub-rule.

Event objects may be implicitly or explicitly defined, including the trigger conditions for such event objects and the corresponding zone policy events or actions. Events/actions may include actions such as information logging, email, telephone calls, alarms, managed entity feedback including via the mobile device, or any other action, or set of actions, suitable for entity tracking and zone policy administration purposes. For example, if an entity "dog" were restricted to a zone "yard" via a zone policy, and the dog were to attempt to leave the yard, an event object may generate entity feedback via an electric shock collar worn by the dog. Should the dog still flee the yard, a telephone call explaining the event may be made to the dog's owner and current location information may be made available via a website.

In some instances a zone may also be mobile. For example, a bus may be defined as a zone as well as an entity, and defined sub-zones may include each seat on the bus, the luggage storage compartments on the bus, etc. Because the bus is mobile, information about the bus may include its current location or other dynamic information such as speed, acceleration, or the like. Other example mobile zones that may be defined include taxi cabs, freight trucks, airplanes, bicycles, ambulances, ferries, partitioned packages, or the like.

In other instances an entity may be any object for which entity tracking and zone policy administration may be of value. For example, a package may be associated with a mobile device and a zone policy may be defined to trigger an instant message event at the moment the package arrives at its destination. In another example, a whale may be tagged with a mobile device and a zone policy defined to alert researchers when the whale enters it's "breeding grounds" zone. In yet another example, a rental car may be associated with a mobile device with a zone policy event being generated should the rental car enter a "restricted" zone. Such an event may, for example, disable the rental car and notify the rental office of the violation and the car's current location.

In another instance mobile devices may form ad-hoc networks or join in a federation of devices. For example, when two soldiers on a "battlefield" zone are within proximity of each other, a "proximity" event may cause their mobile devices to form an ad-hoc network and exchange information regarding currently available weaponry or other important resources/intelligence in the possession of each soldier. Such network formation and communication may take place regardless of communication status with any other device or server.

In yet another example, zone policy may be used to define a "crawl management" policy. In the Internet, web crawling has been a competitive area among search engine competitors and has largely been constrained to cyberspace. However, as technology advances we may see an increase of competitive physical world crawling, such as robotic and or human-guided "crawlers" that crawl and index the physical environment. Such crawlers may include flying devices, such as drone aircraft, miniature aircraft, and other types of flying devices, some of which are currently in-use for aerial surveillance and exploration. Other crawler examples include, but are not limited to, robots or remotely controlled craft operable for land and/or water traversal, or miniature craft such as those designed to inspect buildings, ventilation systems, or even the human body or the like.

Organizations may aggressively make use of crawlers such that there may be crawlers operating in or around homes and offices at all hours of the day. Zone policy may be utilized to specify crawling policies for zones or the like. Such policies may include rules such as, "no crawls for information of type x", rules placing specific limits on a total numbers of crawls of different types in a zone, and/or rules that limit crawling based on statistics such as maximum rate of crawls or the like. "Crawl allowance" policies may allow for physical crawls at particular times and days, at particular locations, altitudes, specifying allowed crawler types, or the like.

Figure 4:
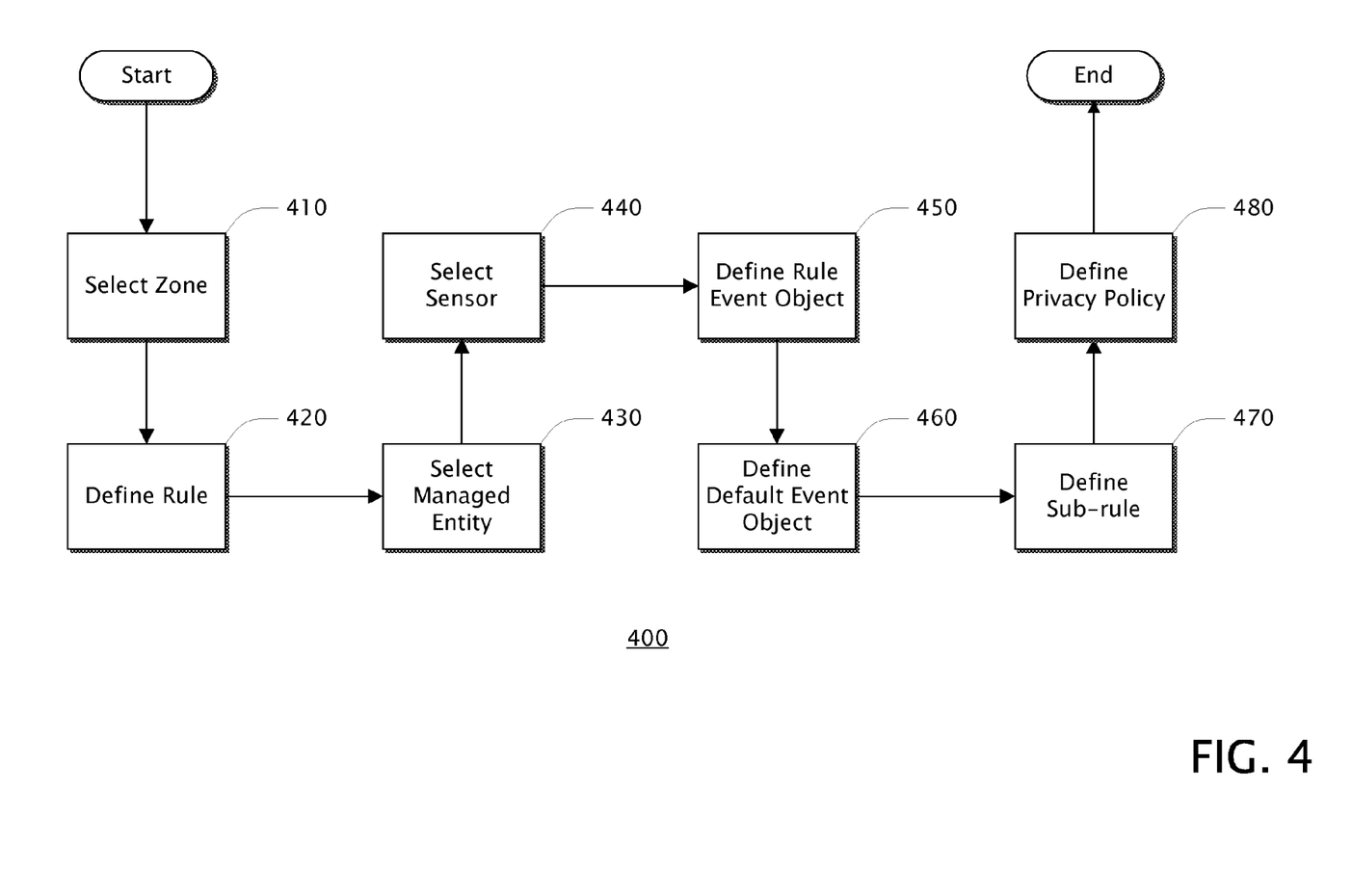
FIG. 4 is a block diagram showing an example process for creating a zone policy.

FIG. 4 is a block diagram showing an example process 400 for creating a zone policy. A zone policy is typically structured in accordance with the zone policy framework described in connection with FIG. 2. In practice a zone policy may or may not include each of the elements of the zone policy framework. Each step of process 400 may be performed or accomplished programmatically, via a user interface, and/or via any other technique.

Block 410 indicates the selection of a zone or sub-zone to which the zone policy will apply. Typically this is done by selecting a zone or sub-zone definition, such as from a list of such definitions. For example, a zone definition for the "CorpY Headquarters" zone may be selected. Such as zone definition may have been previously defined, or may be defined at selection step 410.

Block 420 indicates defining a rule, typically that applies to the selected zone. In general, a zone policy may include any number of rules. An example rule expressed in natural language maybe, "Visitor A must be within 20 feet of Employee 432 while at CorpY Headquarters." A rule may be defined using natural language, code or the like, symbols, a diagram or the like, and/or using any representation useful in defining a rule.

Block 430 indicates selecting a managed entity, typically in association with a rule. For example, using the example rule defined in connection with block 420, "Visitor A" may have been defined as a managed entity when the visitor checked-in at a reception desk, the associated mobile device being an electronic badge. Further, "Employee 432" may have been defined as a managed entity upon hire.

Block 440 indicates selecting a sensor, typically in association with a rule. For example, using the example rule defined in connection with block 420, the term "within 20 feet" may be associated with one or more location sensors. The rule term "while at CorpY Headquarters" may be associated with a marker beacon sensor or with a location sensor. In another example, such terms may be evaluated based on data other than that obtained via a sensor.

Block 450 indicates defining a rule event object, typically in association with a rule. For example, using the example rule defined in connection with block 420, an example rule event object might be "Alert Security" and result in an action to contact security with violation information. This step may also involve selecting a managed entity in some scenarios, such as selecting a specific security entity to receive an alert.

Block 460 indicates defining a default event object, typically in association with a zone policy. A default event object may be defined so as to generate a zone policy event or action on compliance with all rules of the zone policy and/or on violation of any of its rules. For example, using the example rule defined in connection with block 420, an example default event object might result in zone policy action maintaining a "green" indication on a monitoring console and indicating the location of "Visitor A" during compliance with security policy rules.

Block 470 indicates defining sub-rules, typically in association with a rule or sub-rule. Sub-rules tend to be active only when their parent rules are active. For example, using the example rule defined in connection with block 420, an example sub rule "Visitor A's electronic badge must continuously detect Visitor A's heartbeat signature" would only be active when the parent rule is active, such as "while at CorpY Headquarters."

Block 480 indicates defining privacy policy, typically in connection with one or more elements of the zone policy framework. Privacy policy tends to control what information can be accessed and under what conditions that information can be accessed. For example, a privacy policy limiting access to "Visitor A's" non-work related personal information may limit access by "CorpY" to such information.

Figure 5:
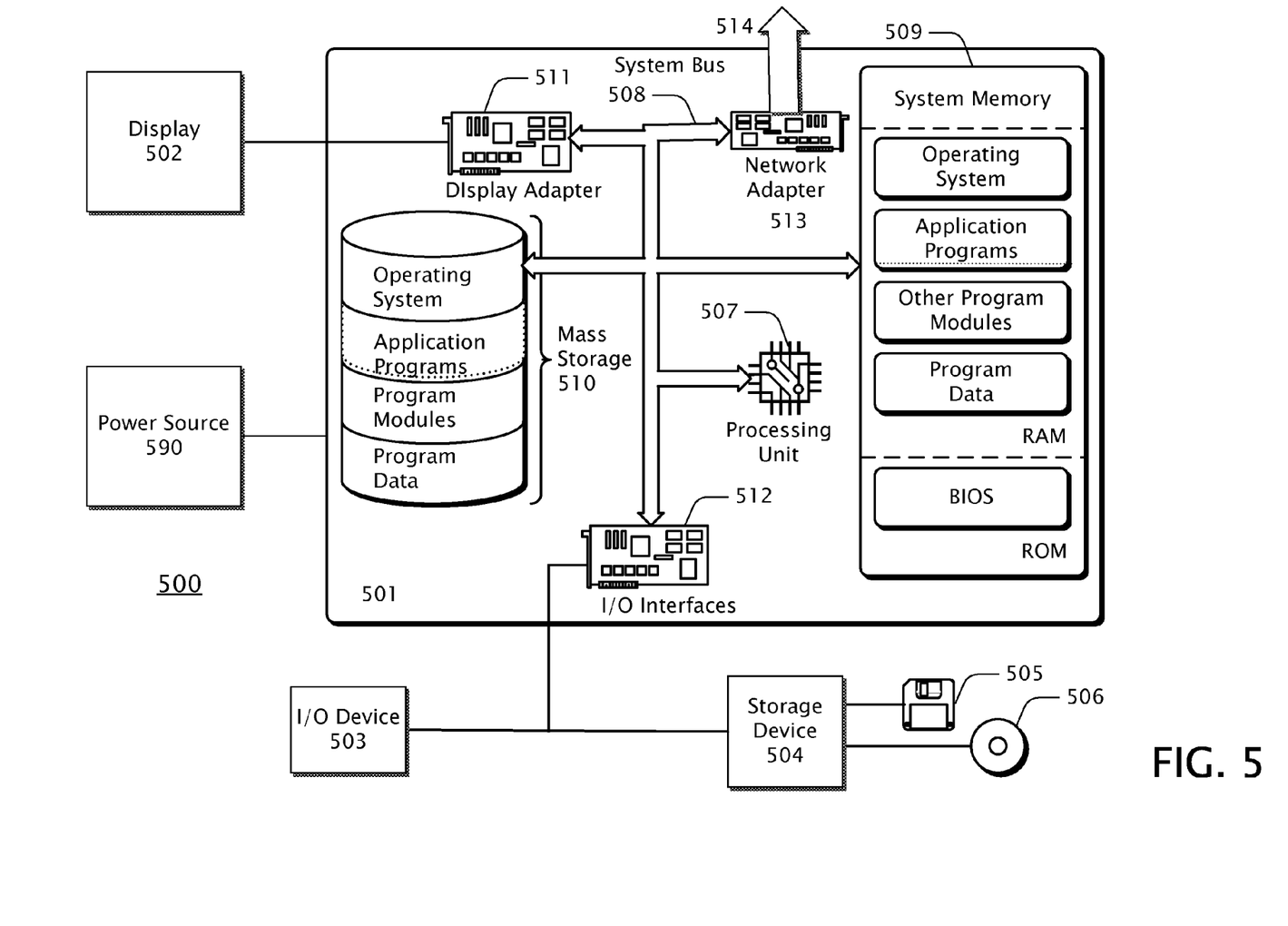
FIG. 5 is a block diagram showing an example computing environment in which the technologies described above may be implemented.

FIG. 5 is a block diagram showing an example computing environment 500 in which the technologies described above may be implemented. A suitable computing environment may be implemented with numerous general purpose or special purpose systems. Examples of well known systems may include, but are not limited to, cell phones, personal digital assistants ("PDA"), personal computers ("PC"), hand-held or laptop devices, microprocessor-based systems, multiprocessor systems, servers, workstations, consumer electronic devices, set-top boxes, and the like.

Computing environment 500 typically includes a general-purpose computing system in the form of a computing device 501 coupled to various components, such as peripheral devices 502, 503, 504 and the like. System 500 may couple to various other components, such as input devices 503, including voice recognition, touch pads, buttons, keyboards and/or pointing devices, such as a mouse or trackball, via one or more input/output ("I/O") interfaces 512. The components of computing device 501 may include one or more processors (including central processing units ("CPU"), graphics processing units ("GPU"), microprocessors ("uP"), and the like) 507, system memory 509, and a system bus 508 that typically couples the various components. Processor 507 typically processes or executes various computer-executable instructions to control the operation of computing device 501 and to communicate with other electronic and/or computing devices, systems or environment (not shown) via various communications connections such as a network connection 514 or the like. System bus 508 represents any number of several types of bus structures, including a memory bus or memory controller, a peripheral bus, a serial bus, an accelerated graphics port, a processor or local bus using any of a variety of bus architectures, and the like.

System memory 509 may include computer readable media in the form of volatile memory, such as random access memory ("RAM"), and/or non-volatile memory, such as read only memory ("ROM") or flash memory ("FLASH"). A basic input/output system ("BIOS") may be stored in non-volatile or the like. System memory 509 typically stores data, computer-executable instructions and/or program modules comprising computer-executable instructions that are immediately accessible to and/or presently operated on by one or more of the processors 507.

Mass storage devices 504 and 510 may be coupled to computing device 501 or incorporated into computing device 501 via coupling to the system bus. Such mass storage devices 504 and 510 may include non-volatile RAM, a magnetic disk drive which reads from and/or writes to a removable, non-volatile magnetic disk (e.g., a "floppy disk") 505, and/or an optical disk drive that reads from and/or writes to a non-volatile optical disk such as a CD ROM, DVD ROM 506. Alternatively, a mass storage device, such as hard disk 510, may include non-removable storage medium. Other mass storage devices may include memory cards, memory sticks, tape storage devices, and the like.

Any number of computer programs, files, data structures, and the like may be stored in mass storage 510, other storage devices 504, 505, 506 and system memory 509 (typically limited by available space) including, by way of example and not limitation, operating systems, application programs, data files, directory structures, computer-executable instructions, and the like.

Output components or devices, such as display device 502, may be coupled to computing device 501, typically via an interface such as a display adapter 511. Output device 502 may be a liquid crystal display ("LCD"). Other example output devices may include printers, audio outputs, voice outputs, cathode ray tube ("CRT") displays, tactile devices or other sensory output mechanisms, or the like. Output devices may enable computing device 501 to interact with human operators or other machines, systems, computing environments, or the like. A user may interface with computing environment 500 via any number of different I/O devices 503 such as a touch pad, buttons, keyboard, mouse, joystick, game pad, data port, and the like. These and other I/O devices may be coupled to processor 507 via I/O interfaces 512 which may be coupled to system bus 508, and/or may be coupled by other interfaces and bus structures, such as a parallel port, game port, universal serial bus ("USB"), fire wire, infrared ("IR") port, and the like.

Computing device 501 may operate in a networked environment via communications connections to one or more remote computing devices through one or more cellular networks, wireless networks, local area networks ("LAN"), wide area networks ("WAN"), storage area networks ("SAN"), the Internet, radio links, optical links and the like. Computing device 501 may be coupled to a network via network adapter 513 or the like, or, alternatively, via a modem, digital subscriber line ("DSL") link, integrated services digital network ("ISDN") link, Internet link, wireless link, or the like.

Communications connection 514, such as a network connection, typically provides a coupling to communications media, such as a network. Communications media typically provide computer-readable and computer-executable instructions, data structures, files, program modules and other data using a modulated data signal, such as a carrier wave or other transport mechanism. The term "modulated data signal" typically means a signal that has one or more of its characteristics set or changed in such a manner as to encode information in the signal. By way of example, and not limitation, communications media may include wired media, such as a wired network or direct-wired connection or the like, and wireless media, such as acoustic, radio frequency, infrared, or other wireless communications mechanisms.

Power source 590, such as a battery or a power supply, typically provides power for portions or all of computing environment 500. In the case of the computing environment 500 being a mobile device or portable device or the like, power source 590 may be a battery. Alternatively, in the case computing environment 500 is a computer or server or the like, power source 590 may be a power supply designed to connect to an alternating current ("AC") source, such as via a wall outlet.

Some mobile devices may not include many of the components described in connection with FIG. 5. For example, an electronic badge may be comprised of a coil of wire along with a simple processing unit 507 or the like, the coil configured to act as power source 590 when in proximity to a card reader device or the like. Such a coil may also be configure to act as an antenna coupled to the processing unit 507 or the like, the coil antenna capable of providing a form of communication between the electronic badge and the card reader device. Such communication may not involve networking, but may alternatively be general or special purpose communications via telemetry, point-to-point, RF, IR, audio, or other means. An electronic card may not include display 502, I/O device 503, or many of the other components described in connection with FIG. 5. Other mobile devices that may not include many of the components described in connection with FIG. 5, by way of example and not limitation, include electronic bracelets, electronic tags, implantable devices, and the like.

Those skilled in the art will realize that storage devices utilized to provide computer-readable and computer-executable instructions and data can be distributed over a network. For example, a remote computer or storage device may store computer-readable and computer-executable instructions in the form of software applications and data. A local computer may access the remote computer or storage device via the network and download part or all of a software application or data and may execute any computer-executable instructions. Alternatively, the local computer may download pieces of the software or data as needed, or distributively process the software by executing some of the instructions at the local computer and some at remote computers and/or devices.

Those skilled in the art will also realize that, by utilizing conventional techniques, all or portions of the software's computer-executable instructions may be carried out by a dedicated electronic circuit such as a digital signal processor ("DSP"), programmable logic array ("PLA"), discrete circuits, and the like. The term "electronic apparatus" may include computing devices or consumer electronic devices comprising any software, firmware or the like, or electronic devices or circuits comprising no software, firmware or the like.

The term "firmware" typically refers to executable instructions, code or data maintained in an electronic device such as a ROM. The term "software" generally refers to executable instructions, code, data, applications, programs, or the like maintained in or on any form of computer-readable media. The term "computer-readable media" typically refers to system memory, storage devices and their associated media, and the like.

In view of the many possible embodiments to which the principles of the present invention and the forgoing examples may be applied, it should be recognized that the examples described herein are meant to be illustrative only and should not be taken as limiting the scope of the present invention. Therefore, the invention as described herein contemplates all such embodiments as may come within the scope of the following claims and any equivalents thereto.

The invention claimed is:

1. A system for tracking a managed entity and administering a zone policy, the system comprising:
   a zone policy server coupled via a network to a mobile device that is associated with an entity, the entity and the mobile device together considered the managed entity, the zone policy server configured for receiving, via the network, a current physical location of the managed entity, and where the entity is a person, animal, or other living creature; and
   a zone policy database coupled to the zone policy server, the zone policy database storing a zone policy that includes zone information defining the zone, entity information defining the entity, and an association between the zone and the entity, where the zone information of the zone policy stored in the zone policy database is configured for defining a zone that is a mobile entity, and further configured for defining physical borders of the mobile zone.

2. The system of claim 1 wherein the zone policy database further comprises an event object defining a zone policy event.

3. The system of claim 1 further comprising a sensor that is distinct from the mobile device and the zone policy server and that is coupled to the mobile device and the zone policy server via the network, wherein the sensor is configured to monitor conditions relevant to the zone policy, and wherein the zone policy database further comprises sensor information defining the sensor.

4. The system of claim 1 wherein the zone policy includes a rule.

5. The system of claim 1 wherein the zone policy is automatically applied to the managed entity when the managed entity is within the zone.

6. The system of claim 1 further comprising a zone policy configuration module configured for creating the zone policy, for defining the zone, for defining the entity, or for associating the selected managed entity definition with the defined rule.

7. The system of claim 1 further comprising a zone policy configuration module configured for associating the mobile device with the entity in the zone information.

8. The system of claim 1 where the zone policy includes a privacy policy that restricts access to the zone information or the entity information.

9. A method performed on a computing device, the method comprising:

selecting a zone definition from one or more zone definitions, where the zone definition defines at least a mobile zone that is a mobile entity, and where the zone definition describes physical borders of the mobile zone;

defining a rule that applies to the zone definition;

selecting a managed entity definition from one or more managed entity definitions, where the selected managed entity definition defines a managed entity, where an entity and a mobile device are together considered the managed entity, and where the entity is a person, animal, or other living creature;

associating the selected managed entity definition with the defined rule;

creating the zone policy to include the zone definition, and the description of the physical borders of the mobile zone, and the rule, and the managed entity definition; and storing the zone policy in a zone policy database.

10. The method of claim 9 where a sensor definition that is associated with the rule is included in the zone policy.

11. The method of claim 9 where a default event object is included in the zone policy.

12. The method of claim 9 where a rule event object that is associated with the rule is included in the zone policy.

13. The method of claim 9 where a sub-rule that is associated with the rule or with another sub-rule is included in the zone policy.

14. The method of claim 9 where a privacy policy is included in the zone policy.

15. A computer-readable device including computer-executable instructions that, when executed by a computer, cause the computer to implement a zone policy framework comprising:

a rule;

a zone definition that defines at least a mobile zone that is a mobile entity, and that describes physical borders of the mobile zone;

a managed entity definition associated with the rule, where the managed entity definition defines a managed entity, where an entity and a mobile device are together considered the managed entity, and where the entity is a person, animal, or other living creature; and a zone policy including the rule, the zone definition, the description of the physical borders of the mobile zone, and the managed entity definition, where the zone policy is stored in a zone policy database.

16. The computer-readable device of claim 15, the zone policy framework further comprising a privacy profile included in the zone policy.

17. The computer-readable device of claim 15, the zone policy framework further comprising a sub-zone definition included in the zone policy.

18. The computer-readable device of claim 15, the zone policy framework wherein the zone policy is a crawler management policy.

* * * * *